(12) United States Patent
de Campos et al.

(10) Patent No.: US 8,774,498 B2
(45) Date of Patent: Jul. 8, 2014

(54) MODELING IMAGES AS SETS OF WEIGHTED FEATURES

(75) Inventors: Teófilo E. de Campos, Grenoble (FR); Florent C. Perronnin, Domène (FR)

(73) Assignee: Xerox Corporation, Norwalk, CT (US)

( * ) Notice: Subject to any disclaimer, the term of this patent is extended or adjusted under 35 U.S.C. 154(b) by 1125 days.

(21) Appl. No.: 12/361,235

(22) Filed: Jan. 28, 2009

(65) Prior Publication Data
US 2010/0189354 A1 Jul. 29, 2010

(51) Int. Cl.
*G06K 9/00* (2006.01)
(52) U.S. Cl.
USPC .......................... 382/155; 382/115; 382/117
(58) Field of Classification Search
USPC ................ 382/115–118, 155–161, 168–172
See application file for complete search history.

(56) References Cited

U.S. PATENT DOCUMENTS

| | | | | |
|---|---|---|---|---|
| 5,850,470 | A * | 12/1998 | Kung et al. | 382/157 |
| 5,987,170 | A * | 11/1999 | Yamamoto et al. | 382/170 |
| 6,075,875 | A | 6/2000 | Gu | |
| 6,111,983 | A * | 8/2000 | Fenster et al. | 382/203 |
| 6,283,954 | B1 | 9/2001 | Yee | |
| 6,463,163 | B1 * | 10/2002 | Kresch | 382/103 |
| 6,604,825 | B2 | 8/2003 | Lai et al. | |
| 7,076,118 | B1 | 7/2006 | Westerman | |
| 7,306,337 | B2 | 12/2007 | Ji et al. | |
| 7,310,628 | B2 | 12/2007 | Sugimoto et al. | |
| 7,418,134 | B2 | 8/2008 | Schwartz et al. | |
| 2003/0091215 | A1 * | 5/2003 | Lauper et al. | 382/117 |
| 2003/0103647 | A1 * | 6/2003 | Rui et al. | 382/103 |
| 2004/0005083 | A1 * | 1/2004 | Fujimura et al. | 382/103 |
| 2004/0105595 | A1 * | 6/2004 | Watanabe et al. | 382/274 |
| 2007/0005356 | A1 | 1/2007 | Perronnin | |
| 2007/0258648 | A1 | 11/2007 | Perronnin | |
| 2008/0069456 | A1 | 3/2008 | Perronnin | |

FOREIGN PATENT DOCUMENTS

| | | |
|---|---|---|
| EP | 1 255 225 | 11/2002 |
| GB | 2 380 348 | 4/2003 |

OTHER PUBLICATIONS

U.S. Appl. No. 11/767,739, filed Jun. 25, 2007, Bressan, et al.
U.S. Appl. No. 11/947,859, filed Nov. 30, 2007, Liu, et al.
U.S. Appl. No. 12/033,434, filed Feb. 19, 2008, Csurka.
U.S. Appl. No. 12/191,579, filed Aug. 14, 2008, Csurka, et al.
Bosch, et al., Image Classification Using ROIs and Multiple Kernel Learning, submitted to *Intl. Journal of Computer Vision* (2008), Available at http://eia.udg.es/~aboschr/Publicacions/bosch08a_preliminary.pdf.
Buscher, et al., Query Expansion Using Gaze-Based Feedback on the Subdocument Level, SIGIR'98: Proc. of the $31^{st}$ *Intl. ACM SIGIR Conference on Research and Development in Information Retrieval*, pp. 387-394, New York, NY (Jun. 2008).
Chum, et al., Near Duplicate Image Detection: min-Hash and tf-idf Weighting, *Proc. $19^{th}$ British Machine Vision Conf.*, Leeds (Sep. 2008).

(Continued)

*Primary Examiner* — Alex Liew
(74) *Attorney, Agent, or Firm* — Fay Sharpe LLP

(57) ABSTRACT

An apparatus, method, and computer program product are provided for generating an image representation. The method includes receiving an input digital image, extracting features from the image which are representative of patches of the image, generating weighting factors for the features based on location relevance data for the image, and weighting the extracted features with the weighting factors to form a representation of the image.

23 Claims, 10 Drawing Sheets

(56) References Cited

OTHER PUBLICATIONS

Clinchant, et al., XRCE's Participation to ImageCLEFphoto 2007, *Working Notes of the CLEF Workshop* (Sep. 2007).

Csurka, et al., A Simple High Performance Approach to Semantic Segmentation, *Proc. 19th British Machine Vision Conference*, Leeds (Sep. 2008).

Csurka, et al., Visual Categorization with Bags of Keypoints, *ECCV Intl. Workshop on Statistical Learning in Computer Vision*, Prague, Czech Republic (May 2004).

Everingham, et al., The PASCAL Visual Object Classes Challenge 2008 Results, (*VOC2008*), http://www.pascal-network.org/challenges/VOC/voc2008/workshop/index.html (2008).

Face Lab, faceLAB 4. *Version 4.6*. www.seeingmachines.com/facelab, copyright date 2008, downloaded Dec. 3, 2008.

Farid, et al, Higher-Order Wavelet Statistics and Their Application to Digital Forensics, In *IEEE Workshop on Statistical Analysis in Computer Vision*, (Oct. 2003).

Farrugio, et al., A Perceptual Adaptive Image Metric for Computer Graphics, in *Proc. Eurographics '04*, vol. 2, (Feb. 2004).

Hardoon, et al., Information Retrieval by Inferring Implicit Queries from Eye Movements, *The 11th Conference on Artificial Intelligence and Statistics* (2007).

Itti, et al., A Saliency-Based Search Mechanism for Overt and Covert Shifts of Visual Attention, *Vision Research*, 40:1489-1506 (2000).

Kadir, et al., Scale, Saliency and Image Description, *Intl. Journal of Computer Vision*, 45(2):83-105, (Nov. 2000).

Klami, et al., Can Relevance of Images be Inferred from Eye Movements?, *Proc. ACM Intl. Conference on Multimedia Information Retrieval (MIR)*, Vancouver, Canada (Oct. 2008).

Kootstra, et al., Paying Attention to Symmetry, *Proc. 19th British Machine Vision Conf.*, Leeds (Sep. 2008).

Krishnapuram, et al., Sparse Multimodal Logistic Regression: Fast Algorithms and Generalization Bounds, *IEEE Transactions on Pattern Analysis and Machine Intelligence*, 27(6):957-968 (Jun. 2005).

Lowe, Object Recognition from Local Scale-Invariant Features, *ICCV (Intl. Conference on Computer Vision)* (Sep. 1999).

Lu, et al., Field-Weighted XML Retrieval Based on BM25, *Advanced in XML Information Retrieval and Evaluation (INEX 2005)*, LNCS 3977, pp. 161-171, Springer (2006).

Marszalek, et al., Learning Object Representations for Visual Object Class Recognition, *Visual Recognition Challenge Workshop*, in conjunction with ICCV (Oct. 2007).

Mikolajczyk, et al., A Performance Evaluation of Local Descriptors, *IEEE Transactions on Pattern Analysis & Machine Intelligence*, 27(10)1 615-1630 (Aug. 2005).

Moosmann, et al., Learning Saliency Maps for Obiect Categorization, *ECCV Intl. Workshop on the Representation and Use of Prior Knowledge in Vision*, Springer (2006).

Oyekoya, Eye Tracking: A Perceptual Interface for Content Based Image Retrieval, *PhD Thesis, DEEE*, University College London, Chapter 3 (Apr. 2007) full text available at http://eprints.ucl.ac.uk/5413/1/5413.pdf.

Parikh, et al., Determining Patch Saliency Using Low-Level Context, *European Conference on Computer Vision (ECCV)* (Oct. 2008).

Perronnin, et al., Fisher Kernel on Visual Vocabularies for Image Categorization, *Proc. of the IEEE Conf. on Computer Vision and Pattern Recognition (CVPR)*, Minneapolis, MN (Jun. 2007).

Salton, et al., A Theory of Term Importance in Automatic Text Analysis, *Journal of the ASIS*, 26(1):33-44 (Jan.-Feb. 1975).

Salton, et al., Term-Weighting Approaches in Automatic Text Retrieval, *Information Processing and Management*, 24(5):513-523 (1988).

Sivic, et al., Video Google: A Text Retrieval Approach to Object Matching in Videos, *Proc. of the Intl. Conference on Computer Vision*, vol. 2, pp. 1470-1477 (Oct. 2003).

Stentiford, Attention Based Similarity, *Pattern Recognition*, 40(3):771-783, Mar. 2007.

Tobii, Tobii X60 & X120 Eye Trackers, *Tobii X60X120 Leaflet*, US, www.tobii.com, (Oct. 2008).

Torralba, et al., Contextual Guidance of Eye Movements and Attention in Real-World Scenes: The Role of Global Features on Object Search, *Psychological Review*, 113(4):766-786 (Oct. 2006).

User Centric, Inc., Eye Tracking, www.usercentric.com/services/eye_tracking, Copyright 2008, downloaded Dec. 3, 2008.

Peters, et al. "Beyond bottom-up: Incorporating task-dependent influences into a computational model of spatial attention," IEEE Conference on Computer Vision and Pattern Recognition (CVPR), Jun. 1, 2007, pp. 1-8.

\* cited by examiner

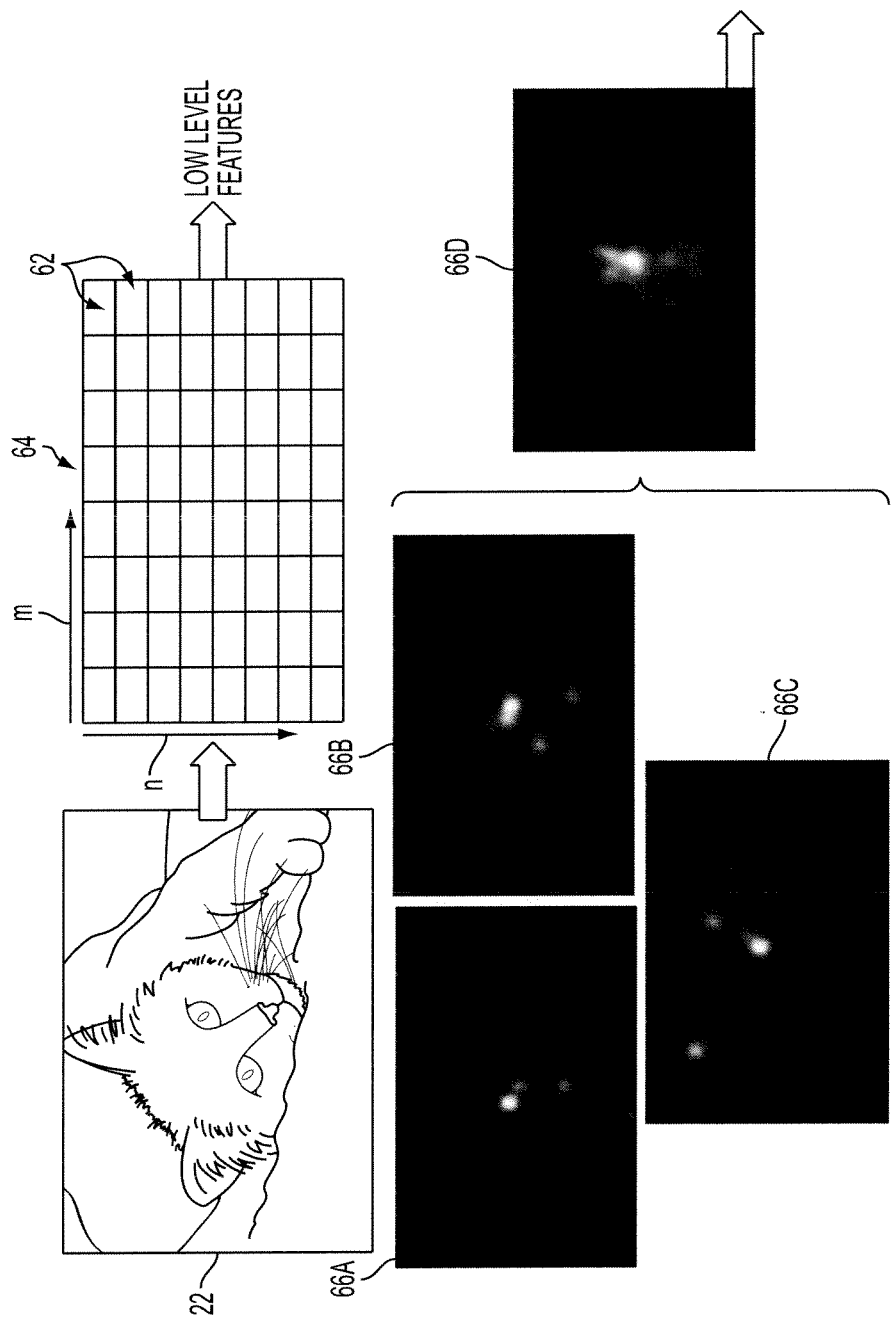

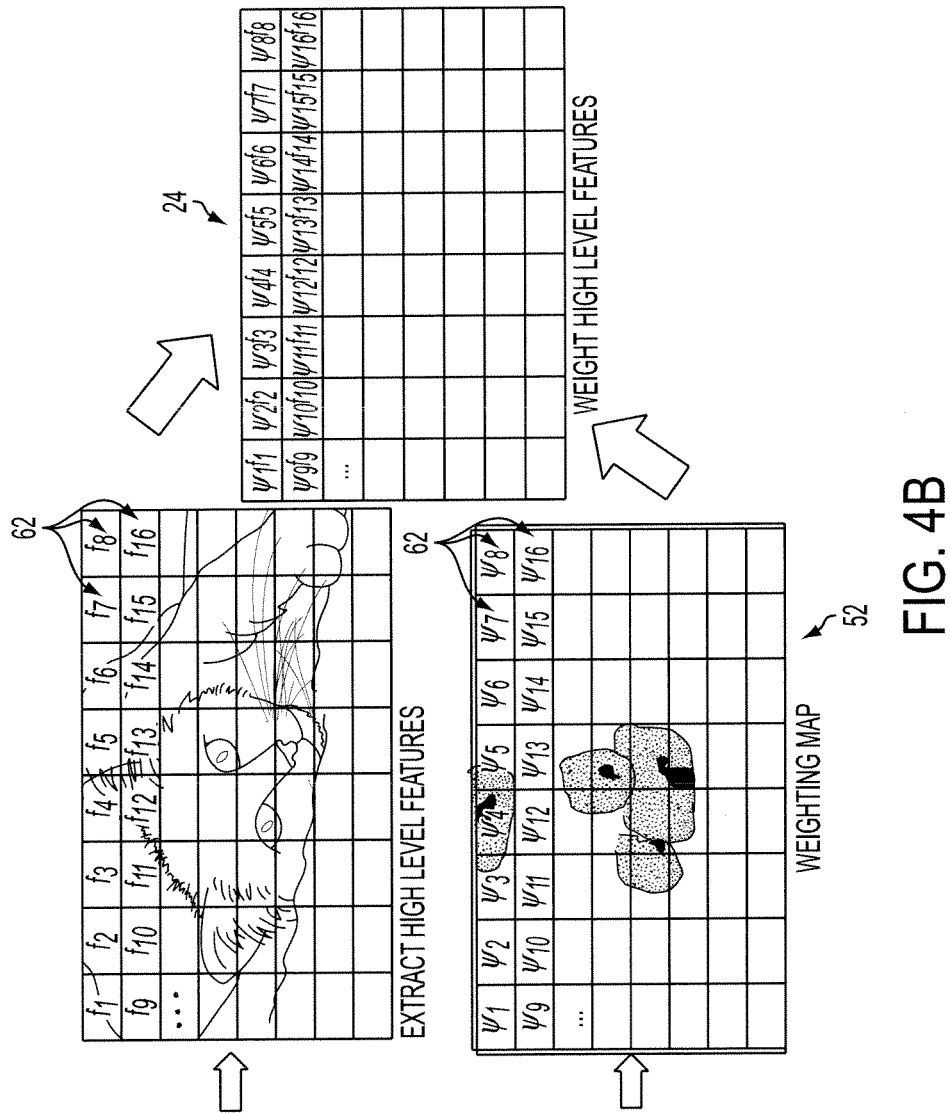

MODELING IMAGES AS SETS OF WEIGHTED FEATURES

CROSS REFERENCE TO RELATED PATENTS AND APPLICATIONS

The following copending applications, the disclosures of which are incorporated herein by reference in their entireties, are mentioned:

U.S. application Ser. No. 11/947,859, filed Nov. 30, 2007, entitled OBJECT COMPARISON, RETRIEVAL, AND CATEGORIZATION METHODS AND APPARATUSES, by Y. Liu and F. Perronnin; and U.S. patent application Ser. No. 12/191,579, filed Aug. 14, 2008, entitled SYSTEM AND METHOD FOR OBJECT CLASS LOCALIZATION AND SEMANTIC CLASS BASED IMAGE SEGMENTATION, by G. Csurka, et al.

BACKGROUND

The exemplary embodiment relates to the image processing. It finds particular application in connection with an apparatus and method which employ location relevance information in the generation of a representation of an image which may find use in image categorization, content-based image retrieval, and image clustering applications. It is to be appreciated that the representations generated are not limited to such applications.

In data processing, some useful operations include automatic or semi-automatic image categorization, automated or semi-automated retrieval of similar images, and clustering of images. For example, given an unorganized database of scanned images of documents, it may be useful to sort or categorize the images into classes such as the type of document.

Since images, such as photographs and scanned documents, contain a large amount of information, such as colorant values for each pixel in the image, it is desirable to generate a representation of the image which involves a reduced set of parameters, yet which provides sufficient information to allow categorization of the image into one or more of a set of classes and/or the assessment of similarities/differences among images. There has thus been a significant research effort into the design of visual words for image categorization, retrieval and clustering. Most image categorization methods follow a sequence which includes (i) feature detection, (ii) low-level feature extraction, (iii) global image or image region representation, and (iv) classification.

Visual saliency models, for example, have been used for feature detection and to estimate regions of interest. Many of these methods are based on biological vision models, which aim to estimate which parts of images attract visual attention. Implementation of these methods in computer systems generally fall into one of two main categories: those that give a number of relevant punctual positions, known as interest (or key-point) detectors, and those that give a more continuous map of relevance, such as saliency maps. Interest point detectors have proven useful for obtaining reliable correspondences or matching. They have also been extensively evaluated as a means to sparsely select positions to extract image features for categorization or object recognition. However, it has been shown that strategies based on dense sampling (or even random sampling) provide better performance (both in accuracy and speed) than interest points. One of the reasons is that interest point detectors may disregard background regions of the image that carry important category information, such as the sky for airplane images. Another reason is their reduced robustness with respect to variations introduced, for instance, by shades. However, interest-point detectors can complement dense feature extraction. For example, several methods are performed and the results are fused in a multiple kernel learning framework. A disadvantage of this approach is that additional sampling strategies increase the computational cost and the complexity of the classification system.

Saliency maps can provide richer information about the relevance of features throughout an image. While interest points are generally simplistic corner (Harris) or blob (Lapace) detectors, saliency maps can carry higher level information. Such methods have been designed to model visual attention and have been evaluated by their congruence with fixation data obtained from experiments with eye gaze trackers.

Recently, saliency maps have been used for object recognition or image categorization. For example, saliency maps have been used to control the sampling density for feature extraction. Alternatively, saliency maps can be used as foreground detection methods to provide regions of interest (ROI) for classification. It has been shown that extracting image features only around ROIs or on segmented foreground gives better results than sampling features uniformly through the image. The disadvantage is that such methods rely heavily on foreground detection and they may miss important context information from the background.

The exemplary embodiment provides a system and method for modeling an image incorporating location relevance information which provides an improvement over existing image processing techniques.

INCORPORATION BY REFERENCE

The following references, the disclosures of which are incorporated in their entireties by reference, are mentioned:

U.S. Pat. No. 7,076,118, entitled DOCUMENT CLASSIFICATION SYSTEM, by Westerman discloses an image system including an imaging device and an associated eye gaze system that determines a non-closed loop portion including multiple points of an image that an eye of a viewer observes. The image system associates the image with the multiple points of the image.

U.S. Pat. No. 6,283,954, issued Sep. 4, 2001, by Yee; U.S. Pat. No. 6,604,825, issued Aug. 12, 2003, by Lai, et al.; and U.S. Pat. No. 7,306,337, issued Dec. 11, 2007, by Ji, et al., all relate to eye tracking systems.

U.S. Pub. No. 2007/0005356, entitled GENERIC VISUAL CATEGORIZATION METHOD AND SYSTEM; U.S. Pub. No. 2007/0258648, entitled GENERIC VISUAL CLASSIFICATION WITH GRADIENT COMPONENTS-BASED DIMENSIONALITY ENHANCEMENT; and U.S. Pub. No. 2008/0069456 entitled BAGS OF VISUAL CONTEXT-DEPENDENT WORDS FOR GENERIC VISUAL CATEGORIZATION, all by Florent Perronnin; and G. Csurka, C. Dance L Fan, J. Willamowski and C. Bray, "Visual Categorization with Bags of Keypoints", ECCV workshop on Statistical Learning in Computer Vision, 2004, disclose systems and methods for categorizing images based on content.

BRIEF DESCRIPTION

In accordance with one aspect of the exemplary embodiment, a method for generating an image representation includes receiving an input digital image, extracting features from the image which are representative of patches of the image, generating weighting factors for the features based on location relevance data for the image, and weighting the extracted features with the weighting factors to form a representation of the image.

In another aspect, a computer implemented apparatus for generating an image representation includes memory for storing an image to be processed, an image representation generator which outputs a representation of an original image as a set of weighted features, the weights for the features being derived from location relevance data for the image, and a source of location relevance data in communication with the image representation generator.

In another aspect, a method for generating an image representation includes receiving an input digital image, extracting features from the image which are representative of patches of the image without considering local relevance, acquiring location relevance data comprising gaze data for at least one observer of the image, generating a saliency map in which pixels of the image are assigned relevance values based on the location relevance data, generating weighting factors for the features based on relevance values in regions the saliency map corresponding to the respective patches, and weighting the extracted features with the weighting factors to form a representation of the image.

BRIEF DESCRIPTION OF THE DRAWINGS

FIG. 4 illustrates the method as applied to an exemplary image;

FIG. 6 is an image visualized by a user, with gaze points indicated by '*' when exposed to a volunteer for 1.03 seconds; and FIGS. 7-9 are heat-maps with values of σ of 1%, 2.8%, and 8% of the image height, respectively.

DETAILED DESCRIPTION

Figure 1:
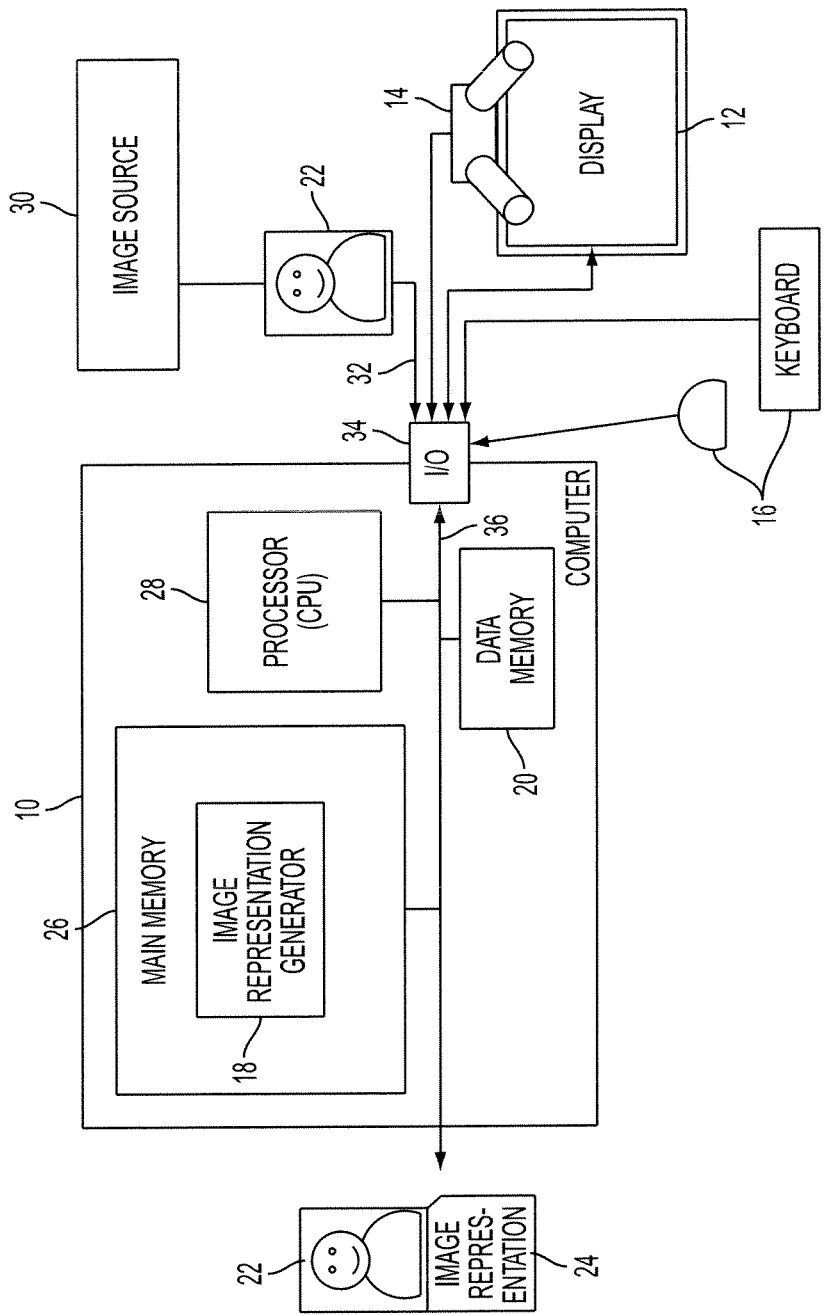
FIG. 1 illustrates an apparatus for generating a weighted feature-based image representation in accordance with one aspect of the exemplary embodiment.

The exemplary embodiment is directed to an apparatus and method for generating a representation of an image which involves weighting of statistical information. The statistical information is derived from features of patches extracted from the image without reference to image content. The weights are derived from location relevance information. Location relevance information (or data) identifies regions of an image which are relevant (or have a high probability of being relevant) in categorizing an image according to its content. For example, in the case of images of animals, such as cats, dogs, and humans, location relevance information may include the locations of the eyes and ears of the animal in the image, which are typically used in distinguishing these three categories of image.

The location relevance information may be obtained from human observations of the image, such as by eye gaze tracking, or derived automatically, e.g., using techniques for extracting salient features. The weights derived from the location relevance information enable statistical information obtained from a region or regions of the image which are considered to be more relevant (either because they draw the attention of a viewer or because of their salient features) to contribute more to the image representation than that obtained from less relevant regions.

In the exemplary method, features are extracted densely from the image and then given weights that are proportional to the rate of attention in the area from where they have come. The method is not limited to any particular method of feature extraction. For example, many feature extraction methods can be implemented efficiently using global image processing steps, so the use of dense sampling is not a time constraint for the speed of the method. One advantage of this method is speed, especially in an image retrieval application. Since the location of the features is fixed to a dense grid, the local features can be extracted and the high level features can be pre-computed and stored in a database. In one embodiment, at application time, only the local weights need to be adjusted to eye tracking measurements and the remaining computations can be very fast. When automatic methods are used to replace gaze data as the location relevance information, the speed advantage is also maintained, even if multiple location relevance methods are applied.

The method generates a weighted feature-based representation ("image representation") of the image. This image representation can be used for categorization, clustering and/or retrieval applications. There are several advantages to the disclosed method. First, it can handle keypoint-based sampling and continuous saliency maps in the same framework. In the case of keypoint-based sampling, the maps are sparse and sharply peaked, while in the case of continuous saliency maps, they are smooth. Secondly, if soft weighting is used (i.e., the weights are not simply binarized but can vary over a range of possible values), the method allows the foreground to be highlighted without disregarding the background. This is an advantage over region of interest (ROI)-based methods, where background information is generally disregarded. Finally, location relevance maps generated from different sources can be used in the same framework. For example, a combination of two or more of: gaze tracking data, supervised foreground probability maps, maps generated from visual attention models, interest point detectors, object location priors and the like can be combined to generate a single weighting scheme.

With reference to FIG. 1, an exemplary apparatus for generating a weighted feature-based image representation is illustrated. The apparatus may be embodied in one or more electronic processing devices, such as the illustrated computer 10. In other embodiments, the electronic processing device 10 may be embodied in one or more computing devices, such as a network server, Internet-based server, personal data assistant (PDA), cellular telephone, or the like.

The computer 10 may include or be in data communication with a display 12, such as an LCD screen, or other output device for displaying or otherwise generating a human-perceptible output. In one embodiment, a localization device receives visual relevance information related to a displayed image. The localization device can be an eye gaze detector 14 and/or a pointing device, such as a cursor control device, e.g., a mouse 16 and/or a keyboard. Accurate and non-intrusive eye gaze tracking devices 14 have recently been developed. Such devices can be used with an image display 12 in order to gather gaze trajectories as users are exposed to images. In other embodiments, location relevance information is acquired automatically using image processing software, as described in further detail below.

The computer 10 is configured to implement an image representation generator 18 for generating a representation of an original input image. Image representation generator 18 may be in the form or software, hardware, or a combination thereof. The exemplary computer 10 includes data memory 20 which may be used or storing an input image 22 and an image representation 24 generated therefrom as we as eye gaze data or other location relevance information. Computer 10 also includes main memory 26, which may be the same as or separate from the data memory, for storing the representation generator 18 in the form of software instructions. Computer 10 further includes a processor 28, in communication with data memory 20 and main memory 26, for executing the software instructions 18 in the performance of the exemplary method disclosed herein and illustrated in FIG. 2. The computer 10 is configured for receiving an original image 22 for which a representation 24 is sought and storing the image 22 in memory, such as data memory 20. The computer 10 is also configured for storing and/or outputting the image representation 24 generated for the image 22 by the image representation generator 18.

The input image 22 generally includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single image data channel, however expressed (e.g., L*a*b*, RGB, YCbCr, etc.). The images may be photographs, video images, combined images which include photographs along with text, and/or graphics, or the like. The images may be received in JPEG, GIF, JBIG, BMP, TIFF or other common file format used for images and which may optionally be converted to another suitable format prior to processing. Input images may be stored in data memory 22 during processing.

The term "color" as used herein is intended to broadly encompass any characteristic or combination of characteristics of the image pixels to be employed in the extraction of features. For example, the "color" may be characterized by one, two, or all three of the red, green, and blue pixel coordinates in an RGB color space representation, or by one, two, or all three of the L, a, and b pixel coordinates in an Lab color space representation, or by one or both of the x and y coordinates of a CIE chromaticity representation or the like. Additionally or alternatively, the color may incorporate pixel characteristics such as intensity, hue, brightness, etc. Moreover, while the method is described herein with illustrative reference to two-dimensional images such as photographs or video frames, it is to be appreciated that these techniques are readily applied to three-dimensional images as well. The term "pixel" as used herein is intended to denote "picture element" and encompasses image elements of two-dimensional images or of three dimensional images (which are sometimes also called voxels to emphasize the volumetric nature of the pixels for three-dimensional images).

Image 22 can be input from any suitable image source 30, such as a workstation, database, scanner, or memory storage device, such as a disk, camera memory, memory stick, or the like. The source 30 may be temporarily or permanently communicatively linked to the computer 10 via a wired or wireless link 32, such as a cable, telephone line, local area network or wide area network, such as the Internet, through a suitable input/output (I/O) connection 34, such as a modem, USB port, or the like. The components 12, 14, 16, 20, 26, 28, 34, of the computer 10 may communicate with each other via a data/control bus 36.

In the case of a computer 10, processor 28 may be the computer's central processing unit (CPU). However, it is to be appreciated that the exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any processor, capable of implementing a finite state machine that is in turn capable of implementing the flowchart shown in FIG. 2, can be used to implement the method for generating an image representation.

Memories 24, 26 may be separate or combined and may be in the form of any type of tangible computer readable medium such as random access memory (RAM), read only memory (ROM), magnetic disk or tape, optical disk, flash memory, holographic memory, or suitable combination thereof.

Figure 3:
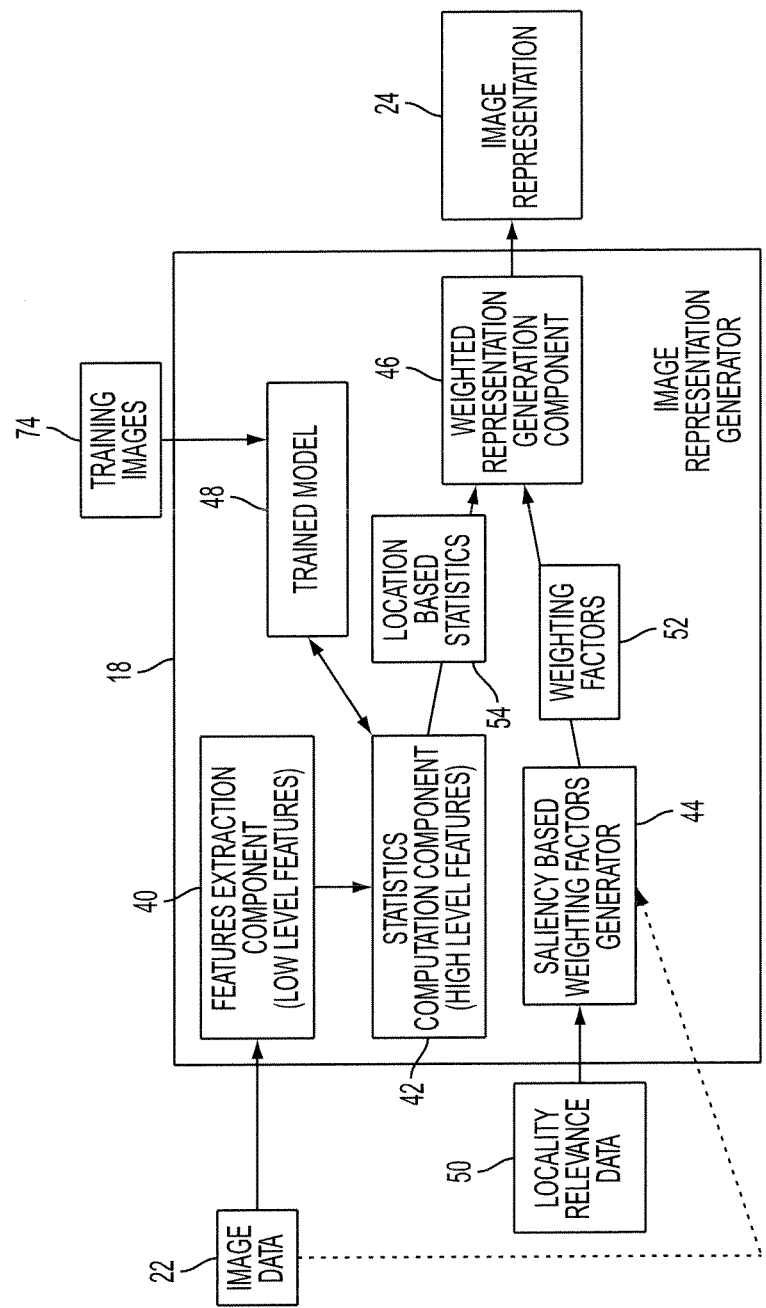
FIG. 3 illustrates the image representation generator of FIG. 1 in accordance with one aspect of the exemplary embodiment.

As shown in FIG. 3, the exemplary representation generator 18 includes a number of software components 40, 42, 44, 46. These include a (low level) features extractor 40, a statistics computation component 42, a weighting factors generator 44, and a weighted representation generation component 46.

These components will be best understood with reference to the exemplary method described below. Briefly, features extractor 40 extracts low level features densely from the image 22, e.g., from localized areas such as patches. Statistics computation component 42 generates a set of statistical representations (high level features) based on these low level features, which are associated with the corresponding locations (patches) of the image. Component 42 may access a trained probabilistic model 48 in generating the statistical representations. Weighting factors generator 44 receives location relevance data 50 for the image being processed, e.g., data acquired from eye gaze detector 14 or automatically from the image 22, and generates weighting factors, e.g., as a weighting map 52 or other representation, in which patches of the images are each assigned a weighting factor. Weighted representation generation component 46 receives the weighting factors map 52 form weighting factor generator 44 and high level features 54 from the statistics computation component 42 and generates an image representation 24 therefrom.

Figure 2:
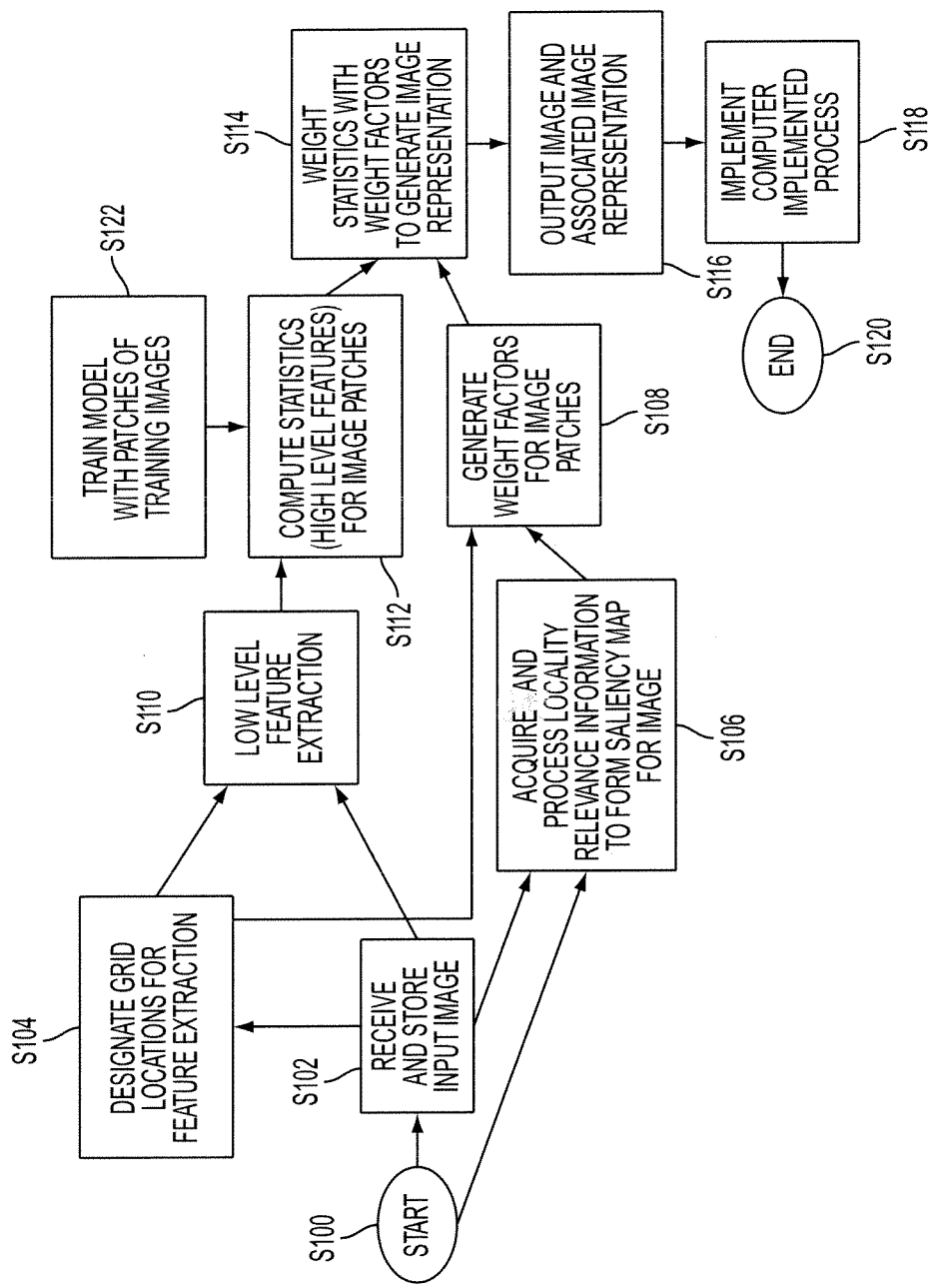
FIG. 2 is a flow diagram illustrating steps of an exemplary method for generating a weighted feature-based representation of an image in accordance with another aspect of the exemplary embodiment.

An exemplary method for generating an image representation 24 is briefly outlined in FIG. 2. A graphical example is illustrated in FIG. 4. The method begins at S100.

At S102, an input digital image 22 for which a representation is desired is received and stored in memory.

At S104, locations for patches 62 of the image 22 are defined. The patches may be defined on a grid 64 at one or more scales, such that some or all of the larger patches may overlap smaller patches. FIG. 4 shows patches 62 generated on a grid at a single scale for ease of illustration (This step may be performed at an earlier stage, e.g., if input images are of the same size).

At S106, location relevance information 50 is obtained for the input image and processed to form a saliency map (or heat map) 66 in which relevance values are assigned to individual pixels or to groups of pixels. The relevance values may vary on a gradual scale, rather than a binary scale, between a minimum value (which may be 0 or greater) and a maximum value (which may be normalized to 1). Higher values indicate a higher relevance. In one embodiment, the saliency map may be automatically derived from the image. In other embodiments, the location relevance data 50 may be received in the form of eye gaze data, e.g., from one or multiple viewers of the image, or other human-derived interest data which may be further processed to generate a heat map or maps 66. FIG. 4, by way of example, shows heat maps 66A, 66B, and 66C, derived from the eye gaze data of three separate observers and a heat map 66D formed by combining the heat maps of twenty-eight individuals.

At S108, weighting factors are generated, based on the saliency map(s) 66 and locations of the patches 62. The weighting factors may be in the form of weighting map 52 in which each of a set of regions (e.g., corresponding to the patches 62) is assigned a single weighting factor W derived from the patch relevance values or a representative patch relevance value.

At S110, sets of low level features (also called descriptors) are extracted from the image without consideration to the relevance information 50 or saliency maps 66. As will be appreciated, step S110 may be performed prior to, contemporaneously with, or subsequent to steps S106 and S108. In the exemplary embodiment, low level features such as gradient features, color features, or a combination thereof are extracted from each patch on the predefined grid at multiple scales.

At S112, statistics (high level features f) are derived for each patch from the previously obtained low level features.

At S114, the extracted high level features obtained at S112 are weighted, based on the weighting factors generated at S108. For example, the map weights ψ are used to locally weight the high level features f. The weights ψ applied to the high level features may be normalized such that they sum to a predetermined value (such as T or 1) over the image. The result of S114 is the generation of a weighted feature-based representation 24 of the image which for illustrative purposes is shown in FIG. 4 as a map. However, it is to be appreciated that the values can be concatenated as a vector or some other representation generated therefrom.

At S116, the representation 24 is associated with the image 22 and output.

Figure 5:
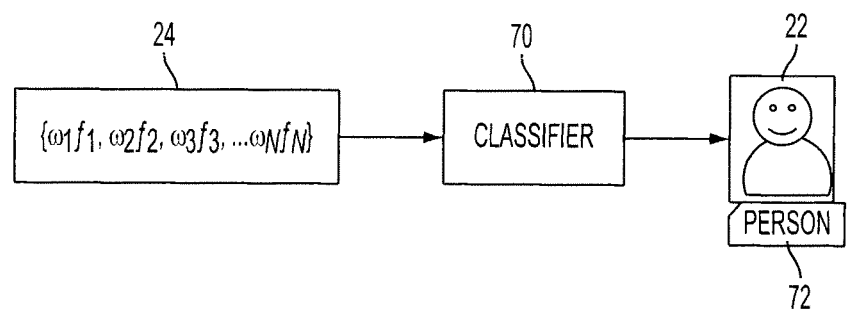
FIG. 5 illustrates a method of training a classifier with weighted feature-based image representations in accordance with one aspect of the exemplary embodiment.

Optionally, at S118, a computer implemented process may be performed which utilizes the image representation 24 thus obtained. This may be performed by a separate component to the image representation generator 18. For example, the image representation 24 for one image 22 can be compared with image representations of one or more other images, derived in the same way, for clustering or similarity determinations. In other embodiments an image 22 may be classified by inputting its image representation 24 into a classifier 70 (FIG. 5) which has been trained on the image representations 24 of a set of manually labeled training images. The classifier may employ Support Vector Machine learning techniques, Naïve Bayes, or the like. In one embodiment, the classifier may be separately trained for foreground and background regions of the images. The trained classifier 70 labels the image with a class label 72 corresponding to one of the image classes on which the classifier has been trained (or probability values for each of a set of classes). The method ends at S120. As a precursor to the method, at S122, the model 48 is trained, using a large set of training images 74, to assign high level features to each patch based on the low level features (FIGS. 2 and 3).

The exemplary image representation described in the foregoing is based on the concept of combining an orderless set of feature vectors. For each instance of an object (i.e., for each image), individual weights are associated to each feature, according to their location relevance. Thus, this location relevance is not pre-computed for a whole dataset and it is not fixed for all the images.

The exemplary method (and representation generator) may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for generating an image representation.

One aspect of the exemplary embodiment relates to a computer program embodied in a computer readable medium for performing some or all of the steps of the exemplary method of FIG. 2. The method illustrated in FIG. 2 may thus be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

Aspects of the apparatus and method will now be described in greater detail.

Image Input (S102)

As noted above, original images 22 to be characterized in the exemplary method may be received by the apparatus in any convenient file format, such as JPEG, GIF, JBIG, BMP, TIFF, or other common file format used for images and which may optionally be converted to another suitable format prior to processing.

Designation of Grid Locations (S104)

The grid locations which define the patches 62 are the same as used for the saliency information. There can be any number of patches extracted for an image, such as from about 50 to 1,000,000, which may depend, in part, on the amount of information (number of pixels) in the image.

Obtaining Visual Relevance information and Generation of Saliency maps (S106) and Weighting Factors (S108)

The location visual relevance or weight ψ, of a high level feature $f_t$ can be estimated by several methods. In the exemplary embodiment, this is done through the computation of saliency maps 66 (S106). The term "saliency map" is used as a generic denomination for image bitmaps in which each pixel (or a small local group of pixels) is assigned a relevance value. There are two main types of methods to compute saliency maps: those that utilize human data or supervision and those that are fully automatic.

1. Saliency Maps Based on Feedback Provided by a User or Several Users

Information about the importance of local image features (location relevance information) can be obtained from users in the form of explicit or implicit feedback.

In explicit feedback, a pointing device 16, such as a mouse, stylus, joystick, location sensitive pen, or the like, can be used by a user while viewing the image on a display 12 to indicate relevant objects or regions of interest in the images.

Figure 6:
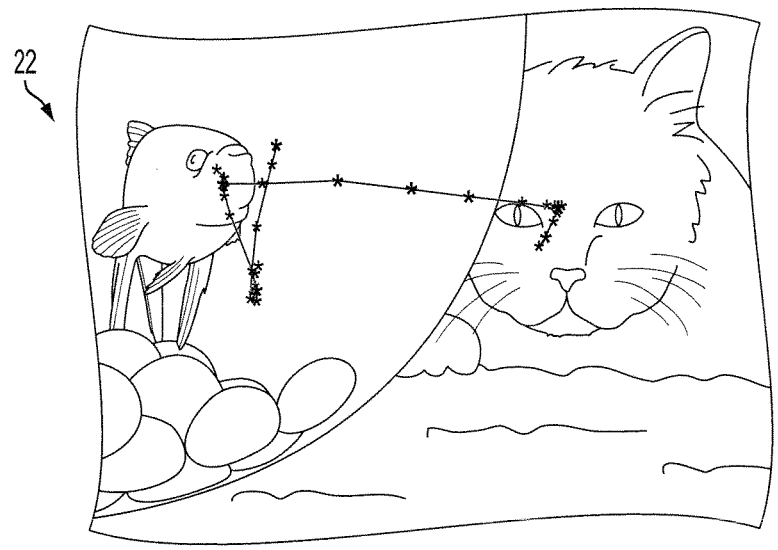
FIGS. 6-9 illustrate the generation of saliency maps from gaze data where

In contrast, implicit feedback is seamlessly obtained from users, without their explicit intention to give such feedback. In the case of visual attention, a good source of implicit feedback is the motion of the eyes. This can be captured with a gaze tracking system 14. Such a system can be fast and have much higher throughput of information than pointing devices 16. For example, eye gaze information 50 is obtained from a gaze tracking device 14. A user views an image, such as a cat (FIG. 4) which is displayed on display 12 during a short period of time. The eye gaze information 50 is obtained by locating the position of the user's gaze on the image (see for example, FIG. 6, where the gaze points are shown as '*'s. The user may be instructed to view the image for just enough time for the user to classify the image into one of a predetermined set of classes (e.g., no more than about 2 seconds), so the eye gaze information can be assumed to be focused primarily on those locations in the image which are key to the user's classification. The eye gaze position may be sampled at short intervals. e.g., about 10-100 times/second.

Eye gaze information 50 from one or a plurality of users may be acquired in this way. The eye gaze information 50 may be obtained, for example, from video images from which the eye position is extracted, from reflections from the pupil, head movements, combinations thereof and the like.

The gaze tracking device 14 can provide a set of image coordinates for an image: $G=\{g_s=(i_s,j_s), s=1, \ldots, S\}$, where $i_s$ and $j_s$ are the coordinates of a gaze position $g_s$. These points specify the scanpath and can be measured while a user is exposed to images. In the first instants of the visualization of a new image, people scan it looking for distinctive features that help them understand its contents. A relevance factor $\psi_t$ can be computed for each pixel or patch as a function of the proximity of its position $x_t$ to gaze points g. This function may be modeled with a Gaussian distribution function, which is a reasonable model for the biological vision and relates to the resolution of the photoreceptor cells in the eyes of primates. Therefore, the image position relevance $\psi(m,n)$ of an image position (m,n) where m and n represent locations on two mutually perpendicular axes of the image, can be modeled by Eqn 1.:

$$\psi(m, n) = \sum_{s=1}^{S} \frac{1}{2\pi\sigma^2} \exp\left(-\frac{(m-i_s)^2 + (n-j_s)^2}{2\sigma^2}\right). \quad \text{(Eqn. 1)}$$

where σ represents the standard deviation of the Gaussian. The effect of increasing σ is to spread the gaze point over a wider area, the larger the value of σ, the larger the area of influence of the gaze point. For example, a value of σ may be selected which is at least about 0.1% of the image height and can be up to about 100% of the image height, or greater. An exemplary value of σ may be from about 1-10% of the image height.

Figure 7:
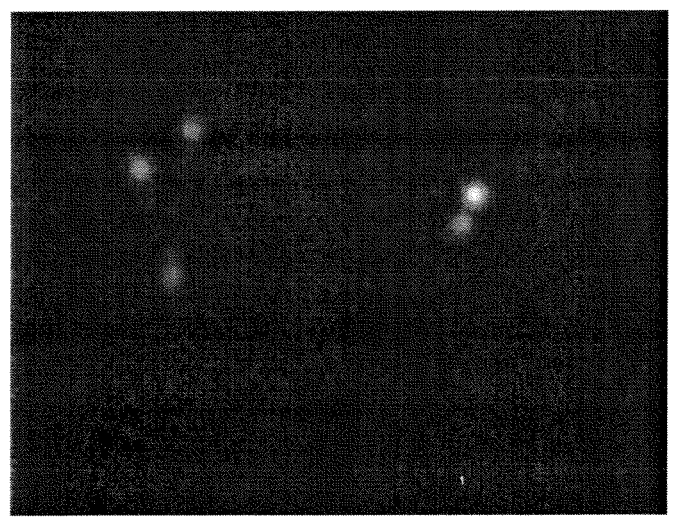
Figure 8:
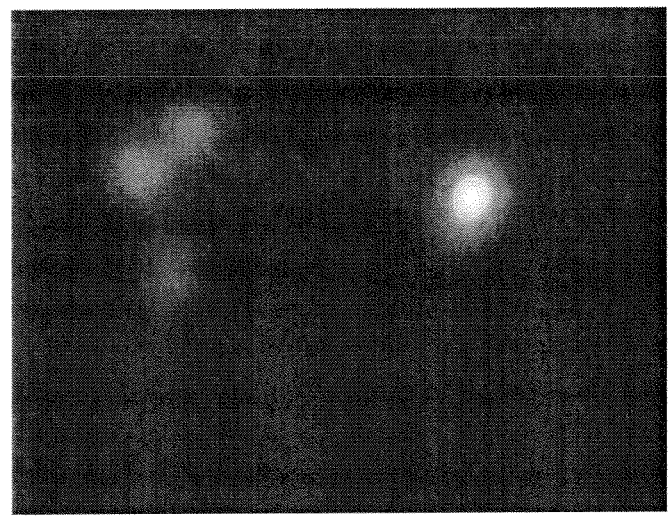
Figure 9:
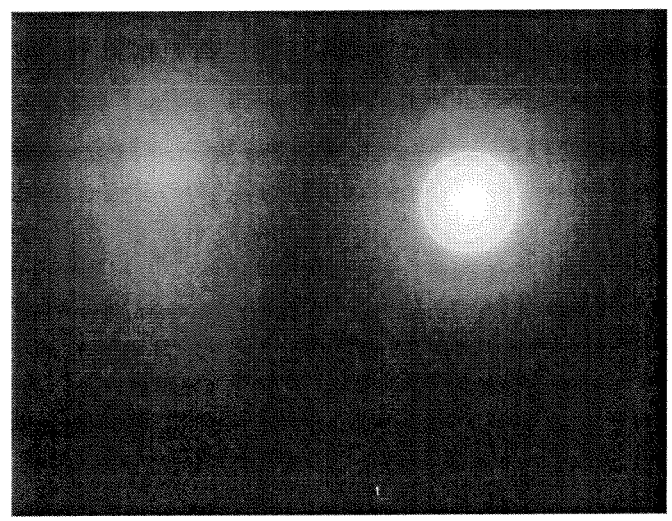

In order to visualize the importance of all the pixel positions, an image 66 can be built with each pixel relevance value set to $\psi(m,n)$. Such an image is referred to herein as a saliency map (or heat map) and is derived the gaze data for an image. A normalized version of a saliency map can be seen as the probability density function of the gaze positions in an image. By way of example, FIGS. 7, 8, and 9 show saliency maps 66 generated from gaze maps of the image 22 shown in FIG. 6, with increasing values of σ. Saliency maps are shown in grayscale, where lighter regions are more salient (higher relevance weight) and darker regions are less salient (lower relevance weight), although it is to be appreciated that other colors could be used. Saliency maps may be obtained by several different users and combined to form a single saliency map. In one embodiment, gaze data may be filtered to remove measurements obtained during saccades. However, Eqn. 1 obviates the need to do this since it automatically filters out such data.

The relevance weight $\psi_t$ of a patch can be considered to be a function of the relevance values of the pixels in the area of this patch. While all the pixels in a patch may be considered in computing the relevance weight $\psi_t$ of the patch, other approximations are contemplated. Three functions for computing the patch weight $\psi_t$ are given by way of example:

1. setting $\psi_t$ to the relevance value $\psi(m,n)$ where (m,n) corresponds to the coordinates of the patch center.
2. setting $\psi_t$ as the average (e.g., the mean, median, or mode) of all the relevance values $\psi(m,n)$ in the patch;
3. setting $\psi_t$ as the maximum of the relevance values $\psi(m,n)$ in the patch.

The first method is computationally the simplest, since only one relevance value of $\psi(m,n)$ needs to be computed. Experiments have shown that the three methods can give similar results when the value of σ is separately tuned.

2. Saliency Maps and Weighting Factors Based on Automatically-Generated Relevance Information In the absence of visual attention data obtained from gaze measurements, or in addition thereto, automatic methods can be employed. Examples of automated methods include:

1. Using a keypoint detection method: this can be used to give a list of points $g_s$, which can then be treated in the same manner as eye gaze points and used to compute a saliency map 66. Such methods are described, for example, in Krystian Mikolajczyk and Cordelia Schmid. A performance evaluation of local descriptors. *IEEE Transactions on Pattern Analysis & Machine Intelligence,* 27(10):1615-1630 (2005).

2. Using bottom-up saliency maps: studies on low level visual attention have produced several models. Based on assumptions of biological vision models, these methods estimate gaze position probability distribution functions (PDFs) that can be treated as saliency maps 66 and used to compute ψ. see, e.g., Laurent Itti and Christof Koch. A saliency-based search mechanism for overt and covert shifts of visual attention. *Vision Research,* 40:1489-1506, (2000); Fred W. M. Stentiford. Attention based similarity. *Pattern Recognition,* 40(3):771-733 (March 2007); Gert Kootstra, Arco Nederveen, and Bart de Boer. Paying attention to symmetry, In *Proc 19th British Machine Vision Conf, Leeds* (2008); and Timor Kadir and Michael Brady. Scale, saliency and image description. *International Journal of Computer Vision,* 45(2):83-105 (November 2001).

By way of example, one bottom-up method is based on the analysis of multi-scale descriptors of color, intensity, and orientations using linear filters. Center-surround structures are used to compute how much features stand out of their surroundings. The outputs of the three descriptors may be combined linearly.

3. Using top-down saliency maps: top-down saliency maps use high level information in order to infer which are the most important regions of an image 22, see, e.g., Antonio Torralba, Aude Oliva, Monica Castelhano, and John Henderson. Contextual guidance of eye movements and attention in real-world scenes: The role of global features on object search. *Psychological Review,* 113(4):766-786 (October 2006); and Frank Moosmann, Diane Larlus, and Frederic Jurie. Learning saliency maps for object categorization. In *ECCV International Workshop on the Representation and Use of Prior Knowledge in Vision.* Springer (2006). Top-down systems model task-specific visual searches. For these methods, the same image can give different responses, depending on what is the search task or the object of interest. Such methods usually require a training phase, in which models of objects of interest, image context or scene categories are learned. They may use contextual information or high-level category information.

The high level information can be a description of the scene type or of the relevant object which may appear in the image. In the latter case, it is possible to use these methods to build one heat-map per class of object, which is in fact a common approach for semantic image segmentation. For each class, a sparse logistic regression method can be learned. Once trained, the classifiers give one score for each class and for each local vector. These scores can be converted into probabilities and interpolated at the pixel level, generating a smooth saliency map for each class. In is case, for each class c, there is one value of $\psi_t^c$. This generates one set of Fisher vectors (or other set of high level features f) per class.

The classification step (S118) can then be adapted to take one different set of vectors per class at both training and testing. This can lead to an improved classification performance for image categorization tasks.

In other embodiments, the class-based saliency maps may be fused to create a single saliency map per image. This fusion can be done by computing the maximum value across the maps for each location.

Whether generated from visual gaze data or automatically, the weights $\psi_t^\bullet$ or $\psi_t^{c\bullet}$ generated in step S108 are taken into consideration when the feature statistics f are cumulated to represent the image (S114).

Extraction of Features (S110, S112)

Local image features $x_t$ are computed using the image patches 62. Various methods exist for extraction of features from images. The exemplary methods involve extracting low level features from patches and, from the low level features generating a representation of the image in terms of a set of statistics, also referred to as high level features f.

Two methods of generating global (high level) features are considered by way of example: 1) a bag-of-visual word (BoV) approach which includes generation of a soft occurrence histogram and 2) a Fisher kernel representation. However, it is to be appreciated that other, similar methods of aggregating local features into global features are contemplated.

In the exemplary BOV and Fisher Kernel approaches, low level features $x_t$ are extracted by dense sampling, although other methods may be used. In particular, patches of the image may be obtained on the predefined grid, optionally at multiple scales. FIG. 4, for example, shows a set of patches 62 at one scale, with the understanding that additionally smaller and/or large patches may be extracted from the same image. In an exemplary embodiment, at least 50 patches are used for each image, e.g., about 200 patches, or more. Random methods of extracting patches are also contemplated.

Both these methods allow an image to be represented as an orderless set of features in which a weight factor (obtained as described for S108) is associated to each feature. Further details of the two methods will now be described.

1. Bags of Visual Words (BoV)

In this approach, the methodology outlined in U.S. Pub. No. 20070005356, entitled GENERIC VISUAL CATEGORIZATION METHOD AND SYSTEM, by PERRONNIN and/or U.S. Pub. No. 20070258648 entitled GENERIC VISUAL CLASSIFICATION WITH GRADIENT COMPONENTS-BASED DIMENSIONALITY ENHANCEMENT, by PERRONNIN may be employed. In a Bag of Visual Words (BOV) approach, the high level features generation step may include accessing a pretrained model 48 with the extracted low level features. The model may have been trained (S122) with patches extracted from a large set of training images 74 (FIG. 3). The training images may include images similar in content to those expected to be processed. The low level features extracted from the training image patches are clustered to form a set of visual words. The model 48 is then used to assign a visual word to the low level feature set of a new image patch 62 based on its similarity to the extracted features of the training patches associated with that word. Or, more generally, the patch is assigned a probability for each of the visual words the model 48 has been trained to recognize, which can be concatenated to form a features vector f.

The BoV approach is thus based on an intermediate representation, the visual vocabulary. In the case of a generative approach, the visual vocabulary is a probability density function (pdf)—denoted p—which models the emission of the low-level descriptors in the image. The set of low level descriptors of an image may be denoted by $X=\{x_t, t=1 \ldots T\}$. The visual vocabulary can be modeled as a Gaussian mixture model (GMM) where each Gaussian (function) corresponds to a visual word. In a visual vocabulary framework, the means of the GMMs represent the visual words. The low level descriptor of a patch 62 (such as a vector comprising the extracted low level features) is fed to the pretrained model 48, which outputs a GMM which is representative of the patch.

Let λ be the set of parameters of probability distribution function p. $\lambda=\{w_i, \mu_i, \Sigma_i, i=1 \ldots N\}$ where $w_i, \mu_i,$ and $\Sigma_i$ denote respectively the weight, mean vector, and covariance matrix of Gaussian i and where N denotes the number of Gaussians. Let $p_i$ be the component i of the GMM so that $$p(x) = \sum_{i=1}^{N} w_i p_i(x).$$

Finally, let $\gamma_i(x_t)$ be the probability that the low-level descriptor $x_t$ is assigned to Gaussian i. This quantity can be computed using the Bayes formula:

$$\gamma_i(x_t) = p(i|x_t, \lambda) = \frac{w_i p_i(x_t|\lambda)}{\sum_{j=1}^{N} w_j p_j(x_t|\lambda)} \quad \text{(Eqn. 2)}$$

While a Gaussian mixture model has been described for representing the general visual vocabulary, it is to be appreciated that other generative models can be employed.

In the BoV representation, the low-level descriptor $x_t$ is transformed into the high-level descriptor $f_t$ as follows:

$$f_t = [\gamma_1(x_t), \gamma_2(x_t), \ldots, \gamma_N(x_t)]$$

An image can be represented by the average:

$$b = \frac{1}{T}\sum_{t}^{T} f_t \quad \text{(Eqn. 3)}$$

Note that this is a soft occurrence histogram. In the exemplary method, Eqn. 3 is modified by assigning a relevance value (or weight) $\psi_t$ (derived as described in S108) to each feature vector $f_t$. This results in the following global image representation:

$$b_w = \frac{1}{T}\sum_{t}^{T} \psi_t f_t \quad \text{(Eqn. 4)}$$

In one embodiment, the weights $\psi_t$ are normalized such that: $\Sigma_t \psi_t = T$. In this case, $b_w$ becomes equivalent to the unweighted b if the values of $\psi_t$ are uniform (and unitary) throughout an image.

Eqn. 4, the weighted BOV representation, can thus serve as a representation 24 of the image.

The low level features $x_t$ which are extracted from the patches are typically quantitative values that summarize or characterize aspects of the respective patch, such as spatial frequency content, an average intensity, color characteristics (in the case of color images), gradient values, and/or other characteristic values. In some embodiments, at least about fifty low level features are extracted from each patch; however, the number of features that can be extracted is not limited to any particular number or type of features for example, 1000 or 1 million low level features could be extracted depending on computational capabilities. In some embodiments, Scale Invariant Feature Transform (SIFT) descriptors (as described by Lowe, in "Object Recognition From Local Scale-invariant Features", ICCV (International Conference on Computer Vision), 1999, are computed on each patch. SIFT descriptors are multi-image representations of an image neighborhood, such as Gaussian derivatives computed at, for example, eight orientation planes over a four-by-four grid of spatial locations, giving a 128-dimensional vector (that is, 128 features per features vector in these embodiments). Other descriptors or feature extraction algorithms may be employed to extract features from the patches. Examples of some other suitable descriptors are set forth by K. Mikolajczyk and C. Schmid, in "A Performance Evaluation Of Local Descriptors", Proceedings of the Conference on Computer Vision and Pattern Recognition (CVPR), Madison, Wis., USA, June 2003, which is incorporated in its entirety by reference. In the illustrated embodiments, a feature vector (a concatentation of the low level features) is employed to characterize each patch. However, other features-based representations can be used, such as a set of features, a two- or more-dimensional array of features, or the like.

2. Fisher Kernel Approach

An alternative to BoV is the Fisher kernel (FK) representation described in above-mentioned U.S. Pub. No. 20070258648 and in F Perronnin and C. Dance. Fisher kernel on visual vocabularies for image categorization. In *Proc of the IEEE Conf on Computer Vision and Pattern Recognition* (*CVPR*), Minneapolis, Minn., USA. (June 2007) (these two references are collectively referred to herein as "Perronnin and Dance"), and which is a generalization of the bag of visual words approach (BOV) for image categorization (see G. Csurka, C. R. Dance, L. Fan, J. Willamowski, and C Bray. Visual categorization with bags of keypoints. In *ECCV International Workshop on Statistical Learning in Computer Vision*, Prague, Czech Republic (May 11-14, 2004).

The FK method, which is based on the Fisher kernel principle, has an advantage over the BoV method in that it can generate a much richer representation of images in a higher dimensional vector space. This increases the discrimination power of the image representation (a vector), which can lead to improved performance in categorization and retrieval. As with the BoV approach, the weighted-feature based image representation produced by the FK method can be fed to a discriminative classifier for categorization, or used to compute the similarities between images for retrieval and clustering.

The FK method uses gradient vectors to describe in which direction the parameters of a generic model p should be modified to best fit the data. As for the BoV method, p represents a probability distribution function whose parameters are denoted by λ. Also, as for the BoV method, a Gaussian mixture model (GMM) can be used as the generative model of the features f. In a visual vocabulary framework, the means of a GMM represent the visual words. The set of low level feature vectors $x_t$ extracted from an image are represented by X and λ is the set of parameters of the GMM. $\lambda = \{w_i, \mu_i, \Sigma_i, i=1, \ldots, N\}$ where $w_i$, $\mu_i$ and $\Sigma_i$ denote respectively the weight, mean vector and covariance matrix of Gaussian i, and where N denotes the number of Gaussians.

In the FK method, the sampled features $X = \{x_t, t=1 \ldots T\}$ of an image can be characterized by the following gradient vector:

$$u(X,\lambda) = \nabla_\lambda \log p(X|\lambda) \quad \text{(Eqn. 5)}$$

Where $\nabla_\lambda$ represents the gradient of the log-likelihood direction in which the parameters should be modified to best fit the data. A variable length sample X is thus transformed into a fixed-length vector u whose size is only dependent on the number of parameters of the model.

This vector can be normalized, which is advantageous for applications which involve using a discriminative classifier, which use an inner product term. The Fisher information matrix $F_\lambda$ may be used for this purpose:

$$F_\lambda = E_X[\nabla_\lambda \log p(X|\lambda) \nabla_\lambda \log p(X|\lambda)^T] \quad \text{(Eqn. 6)}$$

where $E_X$ represents the expectation under X. The normalized gradient vector is thus given by:

$$v(X,\lambda) = F_\lambda^{-1/2} u(X,\lambda) \quad \text{(Eqn. 7)}$$

Under an independence assumption:

$$\log p(X|\lambda) = \sum_{t=1}^{T} \log p(x_t|\lambda). \quad \text{(Eqn. 8)}$$

The likelihood that observation $x_t$ was generated by the GMM is:

$$p(x_t|\lambda) = \sum_{i=1}^{N} w_i p_i(x_t|\lambda). \quad \text{(Eqn. 9)}$$

In the exemplary embodiment, the Gaussian weights $w_i$ are subject to the constraint:

$$\sum_{i=1}^{N} w_i = 1 \quad \text{(Eqn. 10)}$$

and the components $p_i$ are given by:

$$p_i(x_t \mid \lambda) = \frac{\exp\left\{-\frac{1}{2}(x - \mu_i)^T \sum_i^{-1}(x - \mu_i)\right\}}{(2\pi)^{D/2} |\sum_i|^{1/2}}, \quad \text{(Eqn. 11)}$$

where D is the dimensionality of the feature vectors and $|\Sigma_i|$ denotes the determinant of $\Sigma_i$. The covariance matrices are assumed diagonal and the notation $\sigma_i^2 = \text{diag}(\Sigma_i)$ can be used.

In the following, $\gamma_t(i)$ denotes the occupancy probability, i.e., the probability for observation $x_t$ to have been generated by the i-th Gaussian, as in the BoV approach, the Bayes formula gives:

$$\gamma_i(x_t) = p(i \mid x_t, \lambda) = \frac{w_i p_i(x_t \mid \lambda)}{\sum_{j=1}^N w_j p_j(x_t \mid \lambda)} \quad \text{(Eqn. 12)}$$

Straightforward differentiations provide the following results:

$$\frac{\partial \log p(X \mid \lambda)}{\partial w_i} = \frac{\gamma_i(x_t)}{w_i} - \frac{\gamma_1(x_t)}{w_1} \text{ for } i \geq 2 \quad \text{(Eqn. 13)}$$

$$\frac{\partial \log p(X \mid \lambda)}{\partial \mu_i^d} = \gamma_i(x_t)\left[\frac{x_t^d - \mu_i^d}{(\sigma_i^d)^2}\right], \quad \text{(Eqn. 14)}$$

$$\frac{\partial \log p(X \mid \lambda)}{\partial \sigma_i^d} = \gamma_i(x_t)\left[\frac{(x_t^d - \mu_i^d)^2}{(\sigma_i^d)^3} - \frac{1}{\sigma_i^d}\right]. \quad \text{(Eqn. 15)}$$

The superscript d in Eqns. 14 and 15 denotes the d-th dimension of a vector. Note that Eqn. 13 is defined for $i \geq 2$ as there are only (N−1) free weight parameters due to the constraint Eqn. 11: $w_1$ is supposed to be given knowing the value of the other weights. The gradient vector is just a concatenation of the partial derivatives with respect to a the parameters.

To normalize the dynamic range of different dimensions of the gradient vectors, Perronnin and Dance derived a diagonal approximation of $F_\lambda$, which corresponds to a dimension-wise normalization of the dynamic range. Let $f_{w_i}, f_{\mu_i^d}$ and $f_{\sigma_i^e}$ denote the terms on the diagonal of F which correspond respectively to $\partial \log p(X|\lambda)/\partial w_i$, $\partial \log p(X|\lambda)/\partial \mu_i^d$, and $\partial \log p(X|\lambda)/\partial \sigma_i^d$. The normalized partial derivatives are thus $f_{w_i}^{-1/2} \partial \log p(X|\lambda)/\partial w_i$, $f_{\mu_i^d}^{-1/2} \partial \log p(X|\lambda)/\partial \sigma_i^d$, and $f_{\sigma_i^d}^{-1/2} \partial \log p(X|\lambda)/\partial \sigma_i^d$. It can be shown that approximately:

$$f_{w_i} = T\left(\frac{1}{w_i} + \frac{1}{w_1}\right), \quad \text{(Eqn. 16)}$$

$$f_{\mu_i^d} = \frac{Tw_i}{(\sigma_i^d)^2}, \quad \text{(Eqn. 17)}$$

$$f_{\sigma_i^d} = \frac{2Tw_i}{(\sigma_i^d)^2}. \quad \text{(Eqn. 18)}$$

The gradient vector is generated simply by a concatenation of the partial derivatives with respect to all the parameters:

$$g_t = \left[\ldots, \frac{\partial \log p(X \mid \lambda)}{\partial w_i}, \frac{\partial \log p(X \mid \lambda)}{\partial \mu_i^d}, \frac{\partial \log p(X \mid \lambda)}{\partial \sigma_i^d}, \ldots\right] \quad \text{(Eqn. 19)}$$

and $$u(X, \lambda) = \sum_t^T g_t \quad \text{(Eqn. 20)}$$

To include the weight parameters $\psi_t$, $\log p(x_t|\lambda)$ is replaced by $\psi_t \log p(x_t|\lambda)$ in Eqn 20. This results in the following weighted vector:

$$u(X, \lambda) = \sum_t^T \psi_t g_t \quad \text{(Eqn. 21)}$$

This is similar to the weighted BOV as it is a weighted sum of patch level statistics. It can also be shown that the BoV is a special case of the FK representation.

As with the BOV-based representation, any type of local image feature can be used. For example, two different image features: a histogram of edge orientations, which describes texture, and the local mean and variances in RGB to describe color, may be used. In both cases, the local features $x_t$ may be extracted at dense grids for each scale considered. They are computed very efficiently, as global image transformations are applied as a pre-processing step. For each feature type (edge orientations and color), a respective visual vocabulary is built and a respective classifier can be used in classification applications. The outputs of the two separate classifiers can be combined linearly. For classification, the sparse logistic regression method of Krishnapuram, et al. may be used (see B. Krishnapuram, L Carin, M. Figueiredo, and A. Hastemink. Sparse multimodal logistic regression: Fast algorithms and generalization bounds. *IEEE Transactions on Pattern Analysis and Machine Intelligence,* 27(6):957-968 (June 2005).

Incorporating Relevance Weights (S114)

As noted above, in the exemplary embodiment, a weight, or importance value $\psi_t$ is assigned to each feature vector $x_t$. This value can be determined according to the proximity of $x_t$ to an interest point or to a region of interest, as discussed in for S106 and S108. In one embodiment, the weight $\psi_t$ is normalized such that $\Sigma_t \psi_t = T$.

Cross database experiments have shown that one can profit from using a comprehensive image dataset to train a visual vocabulary that can be used to compute Fisher vectors of other image datasets. Preliminary experiments have shown that experiments with small datasets give better results if a vocabulary trained with a large dataset is used.

Applications Utilizing the Weighted Feature-Based Image Representations (S118)

The disclosed method can be associated with a method to infer the relevance of pixel locations either using an eye tracking device or using an automatic attention estimation model. Using a method to infer location relevance, the range of applications expands to incorporate all the applications of fully automatic systems, such as categorization, retrieval and clustering. Example applications of the method now follow.

1. Image retrieval: the distance between two images can be defined as a distance between their image representations. Several suitable measures of similarity/distance between histograms including the dot product, the chi2 distance, the Kullback-Leibler (KL) divergence, the Jensen-Shannon divergence, and the like may be used in computing similarity in the BOV method. In the case of FK, measures such as the Euclidian distance, the Manhattan distance, or the cosine similarity may be used in computing similarity between representations.

For example, a large set S of images and their corresponding representations 24 are stored in memory. A user may input a new image or select one of the set to be used as a target image. Similar images are automatically retrieved from the set, based on the similarity of their representations to that of the target image. For example, the system retrieves images whose representations equal or exceed a threshold of similarity. Alternatively, the ten images (or any other selected number) with the highest similarity measure may be retrieved from the set. The retrieved images may be presented to a user for review, e.g., on the display 12. In this application a query image can be enriched with eye tracking. For later queries with other images, the gaze measurements obtained for that image can be kept to incrementally enrich the dataset for when this image is used as a template.

A component for image retrieval may be included in the representation generator or may be a separate component of the same or a separate computer.

2. Image classification: the representation 24 of the image may be fed to virtually any discriminative classifier 70, as illustrated schematically in FIG. 5. Exemplary classifiers may be based on sparse logistic regression, neural networks, linear discriminant analysis, support vector machines, naive Bayes, or the like. For example, the classifier may be trained with images manually assigned to one of a set of classes, such as cars, portraits, landscapes, seascapes, urban scenes, etc. The classifier assigns a class label 72 to a new image, based on its vector representation. The classifier 70 may be included in the representation generator 18 or may be a separate component of the same computer 10 or a separate computer. Using eye tracking as part of the system, the method allows semi-automatic image annotation. In this application, the user annotates images while the eye tracker gathers gaze information. Once enough images have been annotated, the system can use the annotated images and their gaze information to train a categorization system 70. After that, given a new image that is visualized by the user who would annotate the image, the system can automatically suggest annotations. Given the reduced amount of necessary eye tracking measurements and the speed of the system, the automatic suggestions can speed up the annotation process, since the user will only need to verify annotations (or correct wrong ones).

The assigned class 72 may be used in a further computer implemented process, such as class-based automated image enhancement (see for example, U.S. application Ser. No. 11/767,739, filed Jun. 25, 2007, entitled CLASS-BASED IMAGE ENHANCEMENT SYSTEM, by Marco Bressan, et al., the disclosure of which is incorporated herein by reference in its entirety), class-based image cropping (see for example, U.S. application Ser. No. 12/033,434, filed Feb. 19, 2008, entitled CONTEXT DEPENDENT INTELLIGENT THUMBNAIL IMAGES, by Gabriela Csurka, the disclosure of which is incorporated herein by reference in its entirety), or the like.

3. Image clustering: as the image representation 26 is non-negative, it is well-suited to Probability Latent Semantic Analysis (PLSA) clustering. For example a set of images may be clustered into clusters, based on the similarity of their image representations. The computer 10 or a communicatively linked computer may include a component for image clustering.

Without intending to limit the scope of the exemplary embodiment, the following examples demonstrate the application of the exemplary method to a classification task.

EXAMPLES

1. Experiments Using Eye-Gaze Data

A dataset of images and eye gaze data for the images were used for the evaluation. As a comparison, the method described in U.S. Pub. No. 20070258648 and F. Perronnin and C. Dance. Fisher kernel on visual vocabularies for image categorization. In *Proc of the IEEE Conf on Computer Vision and Pattern Recognition*, Minneapolis, Minn., USA., June 2007 (Collectively Perronnin and Dance) was used on the same image dataset. The Perronnin and Dance method does not use weighted features based on location relevance.

Based on prior classification results with the Perronnin and Dance method, it was observed that one task where the method showed a weakness was in distinguishing subcategories of pets, i.e., cats and dogs. For the present evaluation, a dataset "cat&dogs" containing images of cats, dogs and a third class consisting of other objects, (labeled as the 'neither' class) were used. The dataset consisted of 105 images of cats, 105 images of dogs and 52 images of neither cats nor dogs. The selected images of cats and dogs contained a single instance of the animal and no other labeled object.

In order to collect eye gaze data, a TOBII X120™ tracker 14 was used. This device has a set of infra-red LEDs and an infra-red stereo camera. The tracking is based on detection of pupil centers and corneal reflection. It is represented as having an accuracy of 0.5 degrees and a sample rate of 120 Hz. Calibration is performed by showing a few key points on the screen. Once calibrated for each particular user, some free head movement is allowed, making the system non-intrusive in comparison to other devices. The tracker was connected to a PC 10 with a 19-inch flat-panel monitor 12, using a resolution of 1280×1024. A standard web browser was used for displaying images. The object was to mimic the way people typically would use a workstation.

The interface presents one image at a time in a random order. The images were all scaled to a height of 800 pixels, which fills a significant area of the screen. Volunteers were assigned a simple task: for each image shown, they were asked to hit key 1 if they see a cat, key 3 if they see a dog and space bar if the image does not present cats or dogs. As soon as the user hits a key, the next image is displayed on the screen. The users were asked to perform this task as quickly as possible, so the gaze points measured should be those that were enough for reaching a decision for each image.

Measurements were obtained from 28 volunteers. Their average viewing time per image was of 1.22±0.17 seconds, which is sufficient to obtain approximately 147 gaze measurements per image Table 1 details the timing and the number of true positives that each user achieved in this assignment. Notice that, despite the high true positive rates (which average to 98.15±1.76%), they usually did not reach 100%. One reason is likely due to simple coordination mistakes when pressing keys, although some of the images may be confusing even for humans, for example, where the animal is partially hidden by a foreground object (as in FIG. 6).

TABLE 1

True positives obtained by each volunteer out of a total of 105 images of cats, 105 images of dogs and 52 images of neither, and their total time taken to complete the assignment (in minutes and seconds).

| | #user | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Cat | 103 | 103 | 101 | 102 | 102 | 104 | 105 | 101 | 100 | 102 | 104 | 105 | 102 | 105 |
| Dog | 104 | 104 | 101 | 101 | 104 | 103 | 105 | 103 | 104 | 103 | 104 | 105 | 105 | 103 |
| Neither | 52 | 51 | 51 | 49 | 51 | 50 | 52 | 51 | 51 | 52 | 52 | 52 | 50 | 51 |
| Time | 7:48 | 4:31 | 6:00 | 6:07 | 5:00 | 5:10 | 5:50 | 5:03 | 5:40 | 6:32 | 5:31 | 4:20 | 6:02 | 5:15 |

| | #user | | | | | | | | | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| Cat | 102 | 105 | 102 | 104 | 105 | 102 | 99 | 103 | 100 | 100 | 103 | 105 | 104 | 102 |
| Dog | 104 | 104 | 103 | 104 | 104 | 100 | 104 | 104 | 102 | 99 | 105 | 105 | 99 | 104 |
| Neither | 51 | 52 | 51 | 51 | 52 | 51 | 51 | 52 | 48 | 50 | 52 | 52 | 52 | 52 |
| Time | 4:46 | 4:43 | 5:09 | 4:24 | 5:22 | 4:33 | 5:00 | 5:21 | 4:55 | 5:41 | 6:04 | 4:40 | 5:14 | 5:00 |

The gaze data obtained shows that there is a good level of agreement in the gaze patterns across different volunteers for each given image. When there is an animal in the image, the users tend to perform more fixations around the eyes of the animal. FIG. 4 shows heat maps for a sample image. To evaluate the accuracy of the heat maps, the heat-maps obtained from all the users were combined and a low threshold applied. When shown only those regions of the images which scored a high relevance (only ~2.5% of the original pixels were shown to the observers), the observers were still able to categorize these images between cats, dogs or neither.

Categorization Experiments 10-fold cross validation experiments were performed on the dataset, maintaining the proportion of samples in each class for the training and testing sets of each fold. A GMM was trained with a large database of images which included the subsets of the cats and dogs dataset. A number of experiments were performed varying the value of a in Eqn. 1 from 0.25%-128% of image height. Three approaches were tested for obtaining the weighting factor ψ: mean, maximum and center, as discussed above. In most cases, there was little difference between the results for each. Accordingly, for categorization experiments, the weighting based ψ at the center of the patches was used, since this is the most computationally efficient method.

Figure 10:
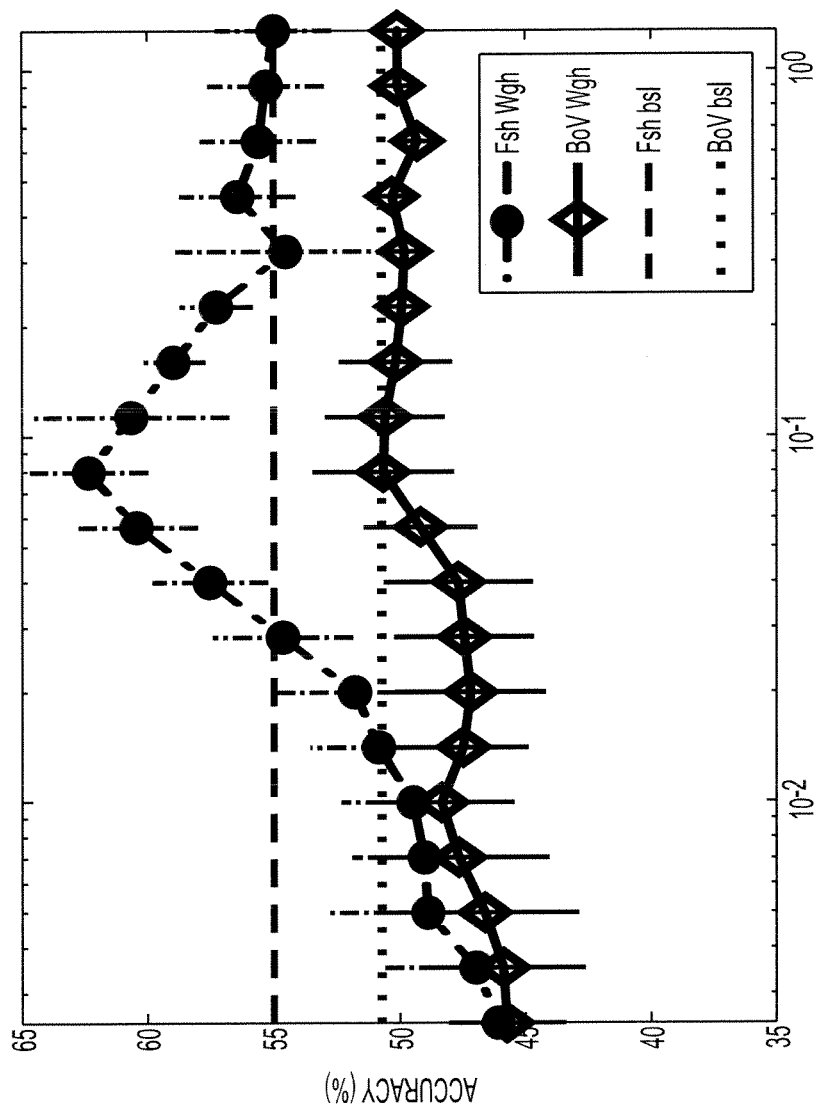
FIGS. 10 and 11 show the results of experiments performed in which the gaze data from a) one person (FIG. 10) and b) multiple people (eleven volunteers) (FIG. 11) was used to generate weight factors for training and one person for testing images. Mean and standard deviation of the results for varying σ are shown.

Due to occlusions, head motion and excessive blinking, the eye tracker sometimes got lost, missing measurements for some images. For these two experiments, the data of users in which this happened was disregarded. In the experiments, two possibilities regarding the gaze data were evaluated. In Method 1, gaze data from a single person was used to generate weight factors for both training and testing images. Data from 11 volunteers was used. The mean and standard deviation of their results were plotted, varying σ (FIG. 10). In Method 2, the automatic image annotation system used a training set which has gaze data from a number of other people. This corresponds to a collaborative annotation scenario. At testing time, eye gaze data of only one person (with no intersection with the people of the training set) is used. Classification experiments were thus performed in a leave-one-out strategy, with respect to the gaze data used for training and testing, obtaining the means and standard deviations plotted in FIG. 11. In each experiment, gaze data from one person was used for testing and the other 10 for training.

Figure 11:
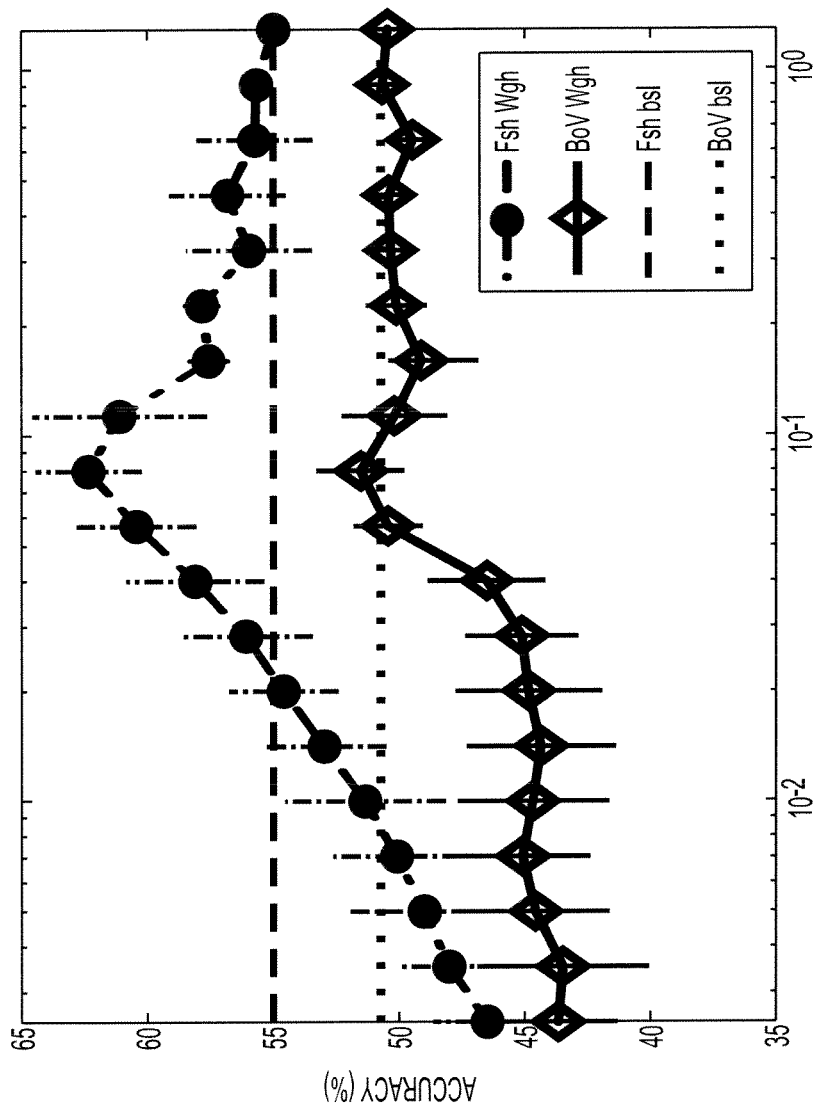

The plots shown in FIGS. 10 and 11 compare the exemplary weighted features using the representation based on Fisher kernels and the representation with simple bag of visual words (BoV). The straight lines labeled as baseline (Fsh BsI and BoV BsI) refer to results obtained with previous approaches based using unweighted BoV and Fisher kernels, respectively. For all tests, the number of Gaussians used in the BoV and FK representations and the regularization parameter of SLR were chosen to be the best parameters for "bsi". Hence, these parameters are not tuned on a per-method basis.

Note that the weighted Fisher kernels representation gave a significant improvement in classification performance for a large range of σ values. The same was not true for BoV, since the BoV representation is not rich enough. It was found that there was no significant difference between the best results obtained by training and testing with a single person and the leave-one-out experiments. This is explained by the fact that despite minor differences, gaze trajectories share many patterns among different users, when these are exposed to the same images.

The curves showing results with weighted features converge to the unweighted Fisher and BOV representations as σ gets too large, i.e., as the weights become more uniform around the image.

Table 2 shows the best result (in % of classification accuracy) of each curve shown in FIGS. 10 and 11. In this three class dataset, random guessing should give a correct classification rate of 33.33%. Table 2 shows the results of for Method 1 and Method 2 as well as Method 3, which was the comparative method, performed without weighting. The Bag of Visual Word approach (BOV) and Fisher Kernel Method (Fisher) results are shown for each method.

TABLE 2

| Method | BOV | Fisher |
|---|---|---|
| 1. individual people | 50.66 ± 2.85 | 62.39 ± 2.38 |
| 2. leave-one-out | 50.99 ± 1.96 | 61.53 ± 2.80 |
| 3. unweighted baseline | 50.76 | 54.96 |

As can be seen, for these tests, the weighted Fisher Kernel method gave the best results overall. A possible reason is that Fisher vectors preserve much richer information about how to adapt a generative model of the data.

2. Experiments Using Automated Methods for Generating Location Relevance Data

Automated methods were evaluated for two datasets: "cats & dogs", as for the experiments with eye gaze data.

For the cats&dogs evaluation a top-down saliency estimation model was derived from the probability maps that are used for semantic image segmentation in the method of G. Csurka and F. Perronnin. A simple high performance approach to semantic segmentation. In *BMVC*, 2008. Each image feature is represented by its FK gradient vector and a patch-based class model is learned using these local vectors. The samples are collected using labeled segmented images. For each class, a sparse logistic regression method was learned. Once trained, the classifiers give one score for each class and for each local vector. These scores are converted into probabilities and interpolated at the pixel level, generating a smooth saliency map for each class. These maps are then used to generate one weight factor for each feature f and each class c.

For training the classifier, gaze-based saliency maps were thresholded, and the automatically extracted features from areas of high visual attention were used as foreground training samples. There are thus two classes of patches (foreground and background). A single classifier is trained and one probability map is automatically created from each image.

3. Semi-Automated Methods

For these tests, the dataset used was PASCAL VOC2008, a large dataset of images containing 20 classes of objects (See M. Everingham, L. V. Gool, C. K. I. Williams, J. Winn, and A. Zisserman. The PASCAL Visual Object Classes Challenge 2008 (VOC2008) Results. http://www.pascal-network.org/challenges/VOC/voc2008/workshop/index.html)

For the PASCAL VOC2008 dataset, the aim was categorization by detecting classes of objects in the images. The results were evaluated with the mean average precision for all the classes. This dataset is split in three sets: train, validation, and test, containing 2113, 2227, and 5717 images, respectively. The validation set was used for these tests. All the objects were manually labeled with rectangular bounding boxes.

In order to preserve background information in the representation, instead of using the bounding boxes as binary maps non-isotropic Gaussians were centered on the bounding boxes. Their standard deviation for each dimension is proportional to the width and height of the boxes. Weights generated from these saliency maps were applied to Fisher kernel gradient vectors as the features. It was found that the weighted representations obtained with these maps lead to an improvement in categorization over results for unweighted Fisher kernel gradient vectors. This shows that the method is able to profit from clean saliency maps generated from explicit feedback given by users.

In summary, a novel image representation has been disclosed which can accommodate feature location relevance. Methods to compute location relevance have been discussed, in particular, using eye gaze tracking data. Experiments have shown that this representation leads to a significant boost in categorization performance in comparison to a state-of-the-art method.

The representation may be based on weighted Fisher kernel vectors, or weighted features in a Bag-Of-Visual-words representation. The present method and representation can also be applied for tasks such as image retrieval and clustering. Automatic methods to estimate location relevance can lead to improved performances in the absence of location relevance indicated by eye tracking data.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for generating an image representation comprising:
   receiving an input digital image;
   extracting low level features from the image which are representative of patches of the image, each patch comprising pixels, and wherein at least fifty low level features are extracted from each patch;
   generating high level features by inputting the low level features into a trained model;
   generating weighting factors for the high level features based on location relevance data for the image; and
   weighting the generated high level features with the weighting factors to form a representation of the image in the form of a feature vector or a map.

2. The method of claim 1, wherein the patches are defined on a regular grid at one or more scales.

3. The method of claim 1 wherein the extraction of the low level features comprises extracting at least one of gradient features and color features from the patches.

4. The method of claim 1, wherein the trained model comprises a Gaussian mixture model.

5. The method of claim 4, wherein the high level features comprise Fisher Kernel gradient vectors.

6. The method of claim 1, wherein the weighting factors of the image representation are normalized to sum to a predetermined value.

7. A method for generating an image representation comprising:
   receiving an input digital image;
   extracting features from the image which are representative of patches of the image, each patch comprising pixels, at least fifty features being extracted from each patch;
   generating weighting factors for the features based on location relevance data for the image, the location relevance data for the image comprises eye gaze data generated by gathering gaze trajectories as at least one user is exposed to the image;
   weighting the extracted features with the weighting factors to form a representation of the image in the form of a feature vector.

8. The method of claim 1, wherein the location relevance data for the image comprises automatically generated relevance data derived from the image.

9. The method of claim 1, wherein the generating of the weighting factors for the high level features comprises generating a saliency map in which pixels or groups of pixels of the image are assigned a relevance value based on the location relevance data.

10. The method of claim 9 wherein a weighting factor $\psi_t$ is computed for each patch by one of:
    setting $\psi_t$ to the relevance value $\psi(m,n)$ where (m,n) corresponds to the coordinates of the patch center;
    setting $\psi_t$ as the average of all the relevance values of $\psi(m,n)$ in the patch; and
    setting $\psi_t$ as the maximum of the relevance values of $\psi(m,n)$ in the patch.

11. The method of claim 9, wherein the location relevance data for the image comprises eye gaze data for at least one observer viewing the image and the generating of the saliency map comprises applying Gaussian functions to eye gaze points in the eye gaze data.

12. The method of claim 9, wherein the location relevance data for the image comprises eye gaze data and wherein in generating the saliency map, pixels or groups of pixels of the image are assigned a relevance value as a function of a proximity to gaze points of the eye gaze data.

13. The method of claim 1, further comprising outputting the image representation associated to the image.

14. A method of computing a similarity between images comprising generating representations of at least two original images by the method of claim 1, the method further comprising:
    computing a measure of similarity between a first of the original images and at least a second of the original images based on their respective vectorial image representations.

15. A method of classifying images comprising:
    generating image representations for a plurality of training images by the method of claim 1;
    training a classifier based on the image representations and respective class labels of the training images; and
    with the trained classifier, assigning a class to a new image based on its image representation.

16. The method of claim 1 further comprising:
    clustering a set of images into at least two groups, based on image representations of the images in the set.

17. A non-transitory computer program product which encodes instructions, which when executed by a computer, perform the method of claim 1.

18. A representation of an image generated by the method of claim 1 comprising a set of weighted high level features.

19. An apparatus for generating an image representation comprising:
    memory which stores instructions for performing the method of claim 1; and
    a processor in communication with the memory for executing the instructions.

20. A computer implemented apparatus for generating an image representation comprising:
    memory for storing an image to be processed;
    an image representation generator which outputs a representation of an original image as a set of weighted features, the features being representative of patches of the image, each patch comprising pixels, at least fifty features being extracted from each patch;
    the weights for the features being derived from location relevance data for the image generated explicitly or implicitly by a user viewing the image; and
    a source of the location relevance data in communication with the image representation generator.

21. The apparatus of claim 20, wherein the source of location relevance data comprises an eye gaze detector which gathers gaze trajectories of at least one user as the at least one user is exposed to the image.

22. A method for generating an image representation comprising:
    receiving an input digital image;
    extracting features from the image which are representative of patches of the image without considering local relevance, each patch comprising pixels, at least fifty features being extracted from each patch;
    acquiring location relevance data comprising acquiring gaze data for at least one observer of the image, the gaze data being acquired in the form of explicit or implicit feedback from the at least one observer viewing the image;
    generating a saliency map in which pixels of the image are assigned relevance values based on the location relevance data;
    generating weighting factors for the features based on relevance values in regions the saliency map corresponding to the respective patches; and
    weighting the extracted features with the weighting factors to form a representation of the image.

23. A method of classifying images comprising:
    generating image representations for a plurality of training images by the method of claim 7;
    training a classifier based on the image representations and respective class labels of the training images; and
    with the trained classifier, assigning a class to a new image based on its image representation.

* * * * *